United States Patent [19]

Jeunhomme et al.

[11] Patent Number: 4,870,269

[45] Date of Patent: Sep. 26, 1989

[54] OPTICAL-FIBER DETECTION DEVICE WHICH INVOLVES TESTING FOR GOOD PERFORMANCE

[75] Inventors: Luc Jeunhomme, Fontenay le Fleury; François X. Desforges, Versailles, both of France

[73] Assignee: Photonetics, Marly le Roi, France

[21] Appl. No.: 151,485

[22] Filed: Feb. 2, 1988

[30] Foreign Application Priority Data

Feb. 2, 1987 [FR] France ................. 87 01195

[51] Int. Cl.⁴ ............................................. H01J 5/16
[52] U.S. Cl. ................................. 250/227; 356/73.1
[58] Field of Search ............ 250/227, 231 R, 231 P; 356/73.1

[56] References Cited

U.S. PATENT DOCUMENTS 4,623,788 11/1986 Kern et al. ..................... 250/227
4,763,009 8/1988 Fevrier et al. .................. 250/227
4,770,535 9/1988 Kim et al. ...................... 250/227

Primary Examiner—Edward P. Westin
Assistant Examiner—Khaled Shami
Attorney, Agent, or Firm—Fleit, Jacobson, Cohn, Price, Holman & Stern

[57] ABSTRACT

An optical-fiber detection device which involves testing for correct operation is provided with at least one sensor having a sensing element which operates by light reflection at the end of an optical fiber and with a line for transmission of light by optical fibers. The transmission line connects the sensor to a source of periodic light pulses and to an electronic signal detection and processing unit. The sensor includes an optical fiber segment of predetermined length between the sensing element and an intermediate connection which produces a state pulse by reflection. The sensing element produces a measurement pulse which is separated from the state pulse by an elementary time interval. The electronic unit serves to detect the state of operation of the sensor by means of the presence or absence of the state pulse or reference pulse in the signals.

4 Claims, 3 Drawing Sheets

OPTICAL-FIBER DETECTION DEVICE WHICH INVOLVES TESTING FOR GOOD PERFORMANCE

BACKGROUND OF THE INVENTION

1. Field of the Invention

The present invention relates to an optical-fiber detection device which involves testing for good performance. The invention proposes a device of particularly simple constructional design which is applicable in particular to detection processes involving the use of a number of sensors, the information provided by these sensors being transmitted by one and the same system of optical fibers between the different sensors and a common electronic processing unit.

2. Description of the Prior Art

Optical-fiber detection devices are already known in which optical fibers are employed for transmitting light radiation from a source usually consisting of a laser diode to a sensor and for conveying light information produced at the sensor along a return path to a unit for electronic processing of this information. These devices are constructed in accordance with many alternative designs, especially in the case of the sensor, depending on the nature of the phenomena which it is sought to detect or the quantity which it is desired to measure. Among these devices, however, the invention is primarily concerned with those in which transmission of incident light and return of information from the sensor take place through the same optical fiber and in which the sensor has a sensitive or so-called sensing head designed for operation by reflection of radiation at the end of an optical fiber.

The use of sensors of this type in industrial measurements often entails the need for a reference with which the signal corresponding to the quantity to be measured may be compared. This reference accordingly undergoes the same variations as the measurement signal in the transmission between the sensor and the electronic processing unit. The solutions proposed up to the present time have not yet proved satisfactory. They consist either in placing two different optical fibers on the same path, one for the measuring head which is sensitive to the quantity to be measured, the other for an identical head which is also located within the sensor but isolated from the quantity to be measured, or in transmitting via the same optical fiber radiations having two different wavelengths, only one of which is affected by the quantity to be measured.

The solution proposed by the present invention removes the undesirable effects which may still remain in designs of the prior art as a result of lengths of fibers which may possibly be different and as a result of attenuations of intensity or effects of curvatures of fibers which may be different at two different wavelengths. This invention accordingly proposes to make use of a reference consisting of a signal produced at the level of the sensor at a predetermined time interval with respect to the measurement signal and transmitted by the same optical fiber at the same wavelength. Whether in combination with the aforesaid reference or not, the invention also proposes to design the sensor and the associated electronic processing unit in such a manner as to check continuously whether the sensor is in a normal state of operation.

SUMMARY OF THE INVENTION

Thus the invention is directed to an optical-fiber detection device which is distinguished by the fact that provision is made for at least one sensor having a sensing element which operates by light reflection at the end of an optical fiber, and a line for transmission of light by optical fibers, said line being intended to connect said sensor to a source for emitting periodic light pulses and to a unit for detection and processing of signals produced by reflection of said pulses in the sensor, that said sensor includes an optical fiber segment of predetermined length between the aforesaid sensing element and an intermediate connector which produces a state pulse by reflection, the function of said sensing element being to produce a measurement pulse which is thus separated from the state pulse by at least one elementary time interval, and that the electronic means aforesaid are adapted to detect the state of operation of the sensor by means of the presence or absence of said state pulse in said signals.

In the practical application of the invention, the length of fiber between the intermediate connector of the sensing element is advantageously chosen so as to ensure that the time interval which elapses between the corresponding pulses is short in comparison with the period of the pulses emitted by the source and nevertheless longer than the time-duration of the light pulses of the source.

The function of the connector designated in the foregoing as an intermediate connector can be performed by a connector placed at the input of the sensor when the transmission line is provided with another connector which is capable of producing a reflection pulse whilst the state pulse is normally located at a predetermined instant with respect to said reflection pulse so that the absence of the state pulse at said predetermined instant indicates faulty operation of the sensor.

In the preferred embodiment of the invention, however, the sensor is provided in addition with an optical fiber segment of predetermined length between said intermediate connector and an input connector for producing by reflection an input pulse which is distinguished in time from the state pulse and from the measurement pulse.

The electronic means are accordingly capable of producing the following results at the same time:
— on the one hand an item of information relating to a fault or non-fault condition in the optical fiber line which transmits the pulses from source to sensor according to the absence or presence of the input pulse in the return signals received;
— on the other hand if the sensor is turned-on or not turned-on according to the presence or absence of the state pulse in said signals.

The operation of the electronic means is facilitated if the length of optical fiber between the input connector and the intermediate connector is chosen so as to introduce between the corresponding pulses the same elementary time interval as between the intermediate connector and the sensing element or a time interval which is a multiple of said elementary time interval.

In another embodiment of the invention, the sensor turn-on information can be given by an input connected or an intermediate connector coupled by means of fiber segments having different lengths with respectively the sensing element and a reference element for producing a reference pulse which is insensitive to the quantity to be measured, this latter being thus separated in time from the measurement pulse. The lengths of fiber segments may be chosen in particular so as to introduce an elementary time interval between the connecting pulse and one of the reference and measurement pulses and an additional elementary time interval between these two reference and measurement pulses.

The present invention is also directed to an optical-fiber detection device having a plurality of sensors as defined in the foregoing and grouped together in order to make use of the same light pulse emission source and the same optical fiber transmission line for transferring the signals from the different sensors to the electronic processing means.

In a first embodiment of a multi-sensor device of this type, provision is made for a coupler which may in particular be of the known "star-coupler" type for coupling the transmission line separately with the different sensors and, between said coupler and the input connectors to the different sensors, transmission of pulses from the source and transmission of return signals are carried out by an optical fiber segment having predetermined lengths which are specific to each sensor for introducing different time-delays between a reflection pulse produced by the coupler and the pulses of the input connectors of the sensors, each time-delay being equal to a multiple of the elementary time interval.

The electronic processing means are accordingly capable of distinguishing among the signals those derived from different sensors between two successive pulses of the source and of determining in each case whether the sensor is connected to the coupler or not whilst line faults will be represented on the pulse produced by an input connector of the coupler.

In the processing of these signals, the invention is applicable not only to measurements involving, in the case of a predetermined sensor, a comparison of intensity level between the measurement pulse and the state pulse, but also to simple detection of an open or closed position, for example, according to the pressure or absence of the measurement pulse. In fact, the intermediate connector of the sensor can advantageously be calibrated so as to produce a reference pulse which is representative of the optical intensity carried within the fiber segment and utilizable for an analog measurement of intensity of the measurement pulse.

In another embodiment of the device in accordance with the invention, the lengths of transmission fiber which are variable from one sensor to another are introduced within the sensors themselves between an input connector which delivers any possible line fault information and an intermediate connector for delivering information relating to connection of the sensor with the state pulse or reference pulse.

In a particular embodiment of the electronic means for processing the signals of each sensor, these latter are adapted to produce the following results at the same time:
first of all an item of information relating to a fault or non-fault condition in the emission device according to the presence or absence of a reflected pulse at the input of said line;
then an item of information relating to a fault or non-fault condition in said line according to the absence or presence of a pulse reflected at the end of said line by an input connector of the coupler;
an item of information relating to a fault or non-fault condition of the coupler according to the absence or presence of a pulse reflected by an input connector of the sensor;
finally, an item of information relating to a fault or non-fault condition of the sensor in which the fault condition may also be non-connection of the sensor to the coupler, according to the absence or presence of a state pulse reflected by said intermediate connector or of a reference pulse reflected by said intermediate connector or by said reference element.

In view of all that has been stated in the foregoing, it will be observed that detection and processing of signals takes place in incoherent light. Accordingly, these signals do not call for any modulation in wavelengths, the different pulses being examined in their time distribution.

DESCRIPTION OF THE PREFERRED EMBODIMENTS

Figure 1:
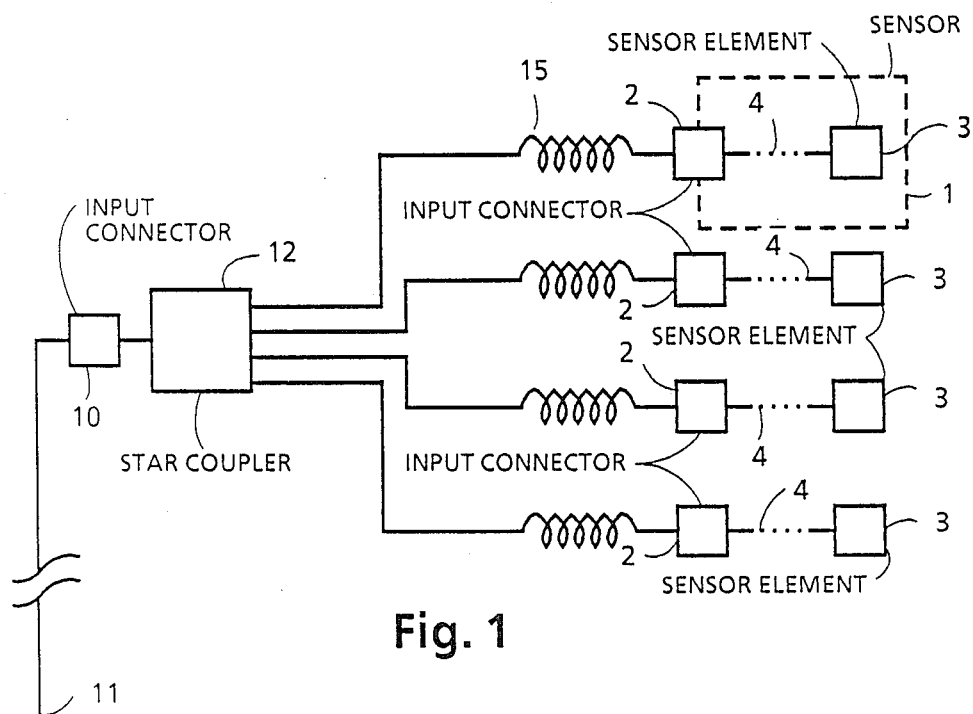
FIG. 1 is a schematic diagram of a multisensor detection device in accordance with the invention and provides an explanatory illustration of the main functions of electronic processing of the signals produced by the sensors.
Figure 1:
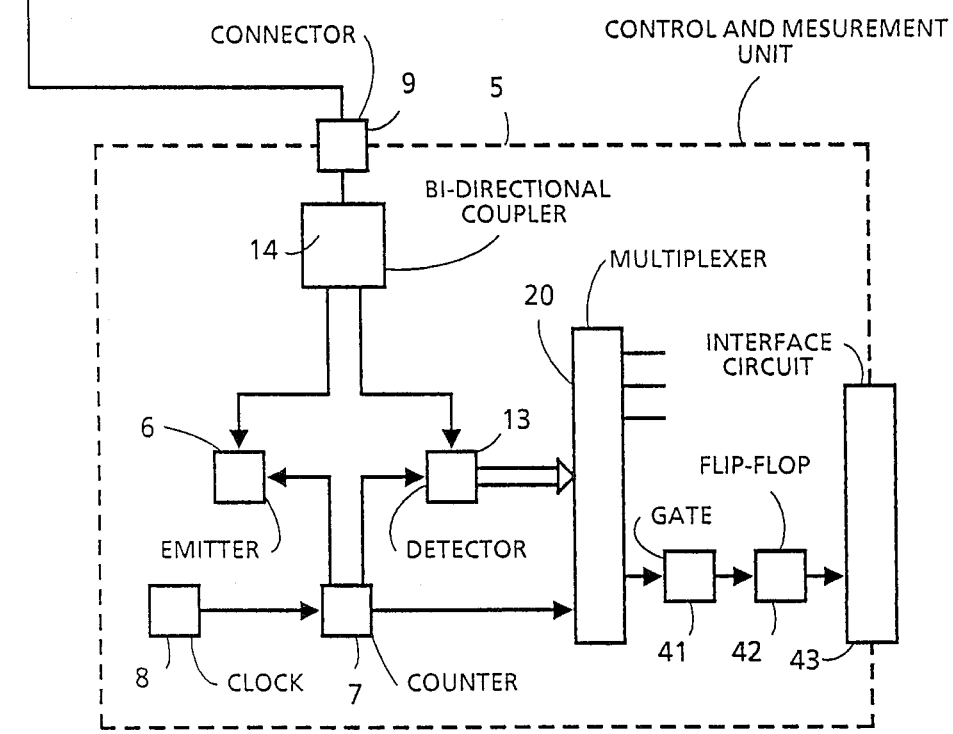

The device of FIG. 1 is provided with any desired number of optical-fiber sensors which can consist of position, pressure or temperature sensors, of sensors for "all-or-none" detection or any type of detector in which a sensing element of conventional design operates on the principle of reflection of light at the end of an optical fiber. Reflection can be either zero or total, for example, depending on the position of a reflecting device consisting in particular of a mirror or retroreflector and incorporated in a sensor head which contains the sensing element. In other cases, the coefficient of reflection may vary as a function of a quantity to be measured such as a distance. It is nevertheless apparent that each sensor 1 is provided with at least one input connector 2 and a sensor head or sensing element 3 which are connected together by means of an optical fiber segment 4.

At a distance from these sensors, the device comprises a control and measurement unit 5 in which is provided a light source 6 consisting of a laser diode which emits radiation pulses at periodic time intervals under the control of a counter 7 associated with a clock 8.

These incident light pulses are emitted at the end of a single optical fiber transmission line 11 which directs them to the different sensors 1 by means of a star-coupler 12. Said single transmission line 11 has the function on the one hand of directing the incident pulses to the coupler 12 and on the other hand of carrying the optical signals which return through the coupler 12 after reflection in the different sensors. However, this line may follow a path of any desired shape and length and may be provided with any connector required for connecting successive fibers to each other along this path. At the ends of the line 11 are provided a connector 9 for establishing a connection with the control and measurement unit 5 and a connector 10 for establishing a connection with the star-coupler 12.

The optical signals transmitted on the return path from the sensors are detected and converted to electric signals by a reception diode 13. This diode is incorporated in the control and measurement unit or housing 5 which also contains a bidirectional coupler 14 for connecting the line 11 to the diodes 6 and 13.

Between the coupler 12 and each of the sensors 1, transmission of light rays takes place along an optical fiber segment 15 of predetermined length. The lengths of the different fiber segments 15 associated with the different sensors are different from each other so as to introduce a time-delay which is specific to each sensor between the return pulse reflected by the input connector 10 of the coupler 12 and the pulses produced at the level of the sensors themselves. By way of example, in the case of a source which produces pulses having a duration of 20 nanoseconds at intervals of 1 millisecond and sensors which deliver signals over a maximum period of 100 nanoseconds, it is possible to choose for the fiber segments 15 lengths which impose a transmission delay of 200 nanoseconds from one sensor to the next, with the result that the reflected pulses are distinguished in time in the cumulation of signals returned from the sensors to the reception diode 13.

Figure 2:
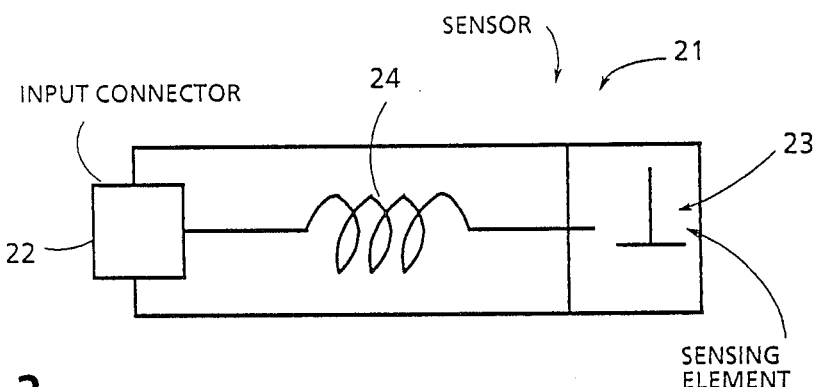
FIG. 2 is a schematic diagram illustrating the arrangement of a sensor which is suited for use in the device of FIG. 1.

In a first alternative embodiment, it is considered that the sensors are of the type shown in FIG. 2. Accordingly, each sensor 21 has an input connector 22 which is connected to the end of a fiber segment 15, and a sensing element 23. The connector 22 and the sensing element 23 are connected together by means of an optical fiber segment 24, the length of which is so determined that, in the signals produced, the reflection pulse of the sensor head is distinguished from the reflection pulse produced at the level of the connector 22 and separated from this latter by a so-called elementary time interval which remains distinctly shorter than the relative time-delays introduced by the fiber segments 15.

Figure 3:
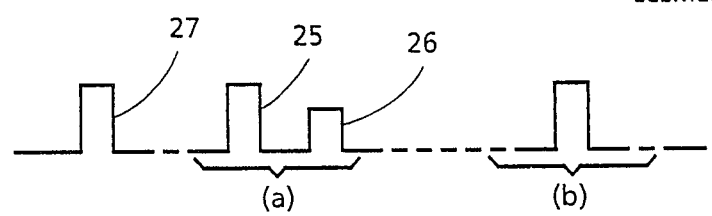
FIG. 3 is a schematic diagram illustrating the composition of signals received from a sensor as shown in FIG. 2.

Accordingly, the signals analyzed by the electronic processing circuits contained in the control and measurement unit or housing 5 are as illustrated in FIG. 3. Each input connector of one sensor performs the function of an intermediate fault-detection connector. By way of example, a signal (a) shows in this figure that the line 15 of the corresponding sensor is in fact connected to the star-coupler 12 since it contains a state or reference pulse 25 derived from the connector 22 after a pulse 27 which comes from the connector 10 located at the level of the coupler. In fact, if a break were to occur in the corresponding line 15, the pulse 25 would be absent or else would take place at an abnormal instant. It is assumed that the signal (a) is followed by a signal (b) which also indicates that the corresponding sensor is correctly connected in respect of a different length of the fiber segment which connects it to the coupler.

The pulse of an "all-or-none" sensor is represented by the presence (signal a) or the absence (signal b) of a pulse 26 after the pulse 25. If necessary, analog processing of the signals for establishing the ratio between the reflected intensities in the pulse 26 and the pulse 25 serves to determine a quantity to be measured by the sensor head with reference to the pulse produced by the connector 22, this latter being suitably calibrated for this purpose.

Figure 4:
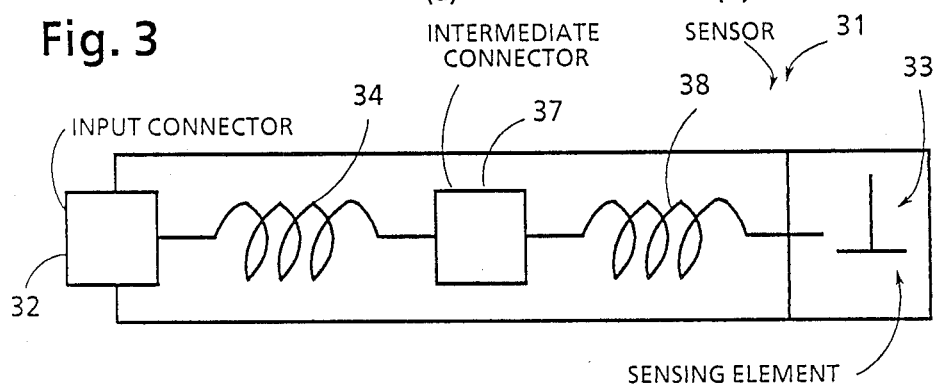
FIG. 4 is a schematic diagram illustrating the arrangement of a sensor in accordance with the invention and in another embodiment which is suited for use in the device of FIG. 1.

FIG. 4 illustrates another sensor in accordance with the invention which may advantageously be employed either as a unitary sensor or for the purpose of constituting the different sensors of FIG. 1. In this case, the sensor 31 has two connectors for producing reflection pulses in addition to the sensor head 33. An input connector 32 is connected by means of an optical fiber segment 34 to an intermediate connector 37 which is in turn connected in series with the sensor head 33 by means of an optical fiber segment 38. Each of the optical fiber segments 34 and 38 has a length calculated to introduce the same elementary time interval between the different pulses.

Figure 5:
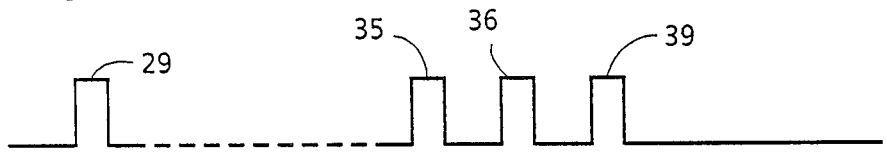
FIG. 5 is a schematic diagram illustrating the composition of signals received from a sensor as shown in FIG. 4.

The signals produced by sensors in accordance with FIG. 4 are illustrated in FIG. 5. Except in the event of a fault occurrence on the line 11, said signals are made up of two different pulses derived from the connectors 9 and 10, only the pulse 29 of the input connector 10 to the coupler 12 having been shown in the figure. If the connecting fiber between the coupler and the sensor is not broken, a pulse 35 is subsequently present at the input connector 32 of the sensor. This pulse is normally followed by a pulse 36 delivered by the intermediate connector 37 prior to a measurement pulse 39 produced by the sensing head 33. The pulse 36 constitutes the state pulse whose presence indicates that the sensor is connected and in the normal state of operation. If so required, said pulse 36 may also be employed as a reference pulse in analog measurements involving a comparison between the intensities respectively of the measurement pulse and of the reference pulse.

These signals are processed in digital form by the electronic circuits incorporated in the control unit 5. As shown in FIG. 1, the signals received successively after each incident pulse are addressed by a multiplexer 20 to a series of electronic circuits which are specific to the different sensors. In the case of each sensor, these circuits have a gate 41 which, under the control of the counter 7, selectively enables the pulses from the corresponding sensor to pass to a flip-flop 42 which retains them for processing and final zero-resetting at the following incident pulse. Interface circuits 43 initiate display of information and are also capable of triggering alarm systems in the event of faulty operation of the sensors.

Processing of signals by means of logic tables serves to check in the case of each logic word corresponding to the signals received from a unitary sensor:

(1) Whether the reflection pulse of connector 9 at the input of line 11 is present at the predetermined instant or not: the absence of this pulse indicates a fault in transmission.

(2) Whether the reflection pulse of connector 10 at the input of coupler 12 is present at the predetermined instant or not: the absence of this pulse indicates a fault condition in the transmission line 11 either because this latter is not connected to the radiation-emission source or because a break has taken place on the line path.

(3) Whether the so-called input pulse resulting from reflection from the input connector of the sensor is present or not: the absence of this pulse indicates that the sensor is not connected to line 11 or that a break has occurred in the connecting line between the coupler 12 and the sensor.

(4) Whether the state pulse or reference pulse 36 from the intermediate connector 37 is present or not: the absence of this pulse indicates that the sensor is not connected to the end of the coupling fiber segment 15 or that an internal break has occurred.

(5) Whether the measurement pulse 39 produced by the sensor head is present or not: this indicates a closed or open position, for example.

The presence of the pulses 35 and 36 at the predetermined instants confirms that the sensor is connected and in the operative state. Since the pulse 36 is representative of the optical intensity introduced in the sensor, said pulse accordingly makes it possible to calibrate the measurement reflection at the time of analog measurements. The desired result is then obtained by establishing the intensity ratio between the two pulses.

Figure 7:
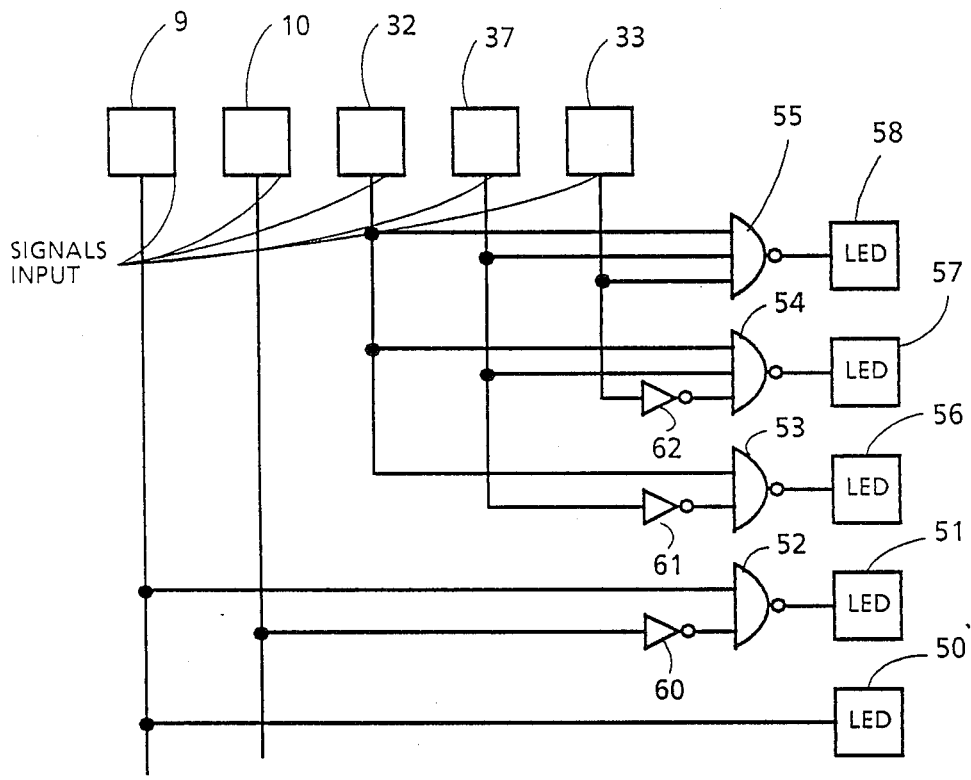
FIG. 7 is a diagram of logic processing of the signals.

In the case of measurements performed on the "all-or-none" principle, it is only necessary to detect the presence or absence of the so-called measurement pulse and no intensity measurement is performed. The logic circuits whose design objective has been stated earlier can be constructed as shown in FIG. 7. The different signals corresponding respectively with the connectors 9, 10, 32 of the reference element and of the measurement element serve to initiate turn-on or turn-off of different diodes forming part of a display device. Each diode is controlled by a transistor (not shown), the conducting or non-conducting state of which is determined from the signals aforesaid.

The diode 50 in which the conductor is directly controlled by the signal associated with the connector 9 is turned-on in the event of a fault occurrence in the emission. The diode 51 at the output of a NAND-gate 52 which receives the signal associated with the connector 9 and, after inversion by inverter 60, the signal associated with the connector 10, indicates a fault on the main line at the instant of turn-on.

The other gates 53, 54, 55 are again present whenever sensors are connected to the coupler of the main line. The NAND-gate 53 receives the pulse associated with the input connector 32 and the inverted pulse (via inverter 61) associated with the intermediate connector 37 for initiating turn-on of a diode 56 in the event of a fault occurrence upstream of the reference element. This element therefore indicates the state corresponding to good performance or a fault occurrence. The NAND-gates 54 and 55 which receive the two signals associated with the connectors 32 and 37 plus the signal associated with the sensing head 33 respectively with and without inversion by inverter 62 initiates display of the measurement by turning-on the diode 57 (negative result or "none") or the diode 58 (positive result or "all").

Figure 6:
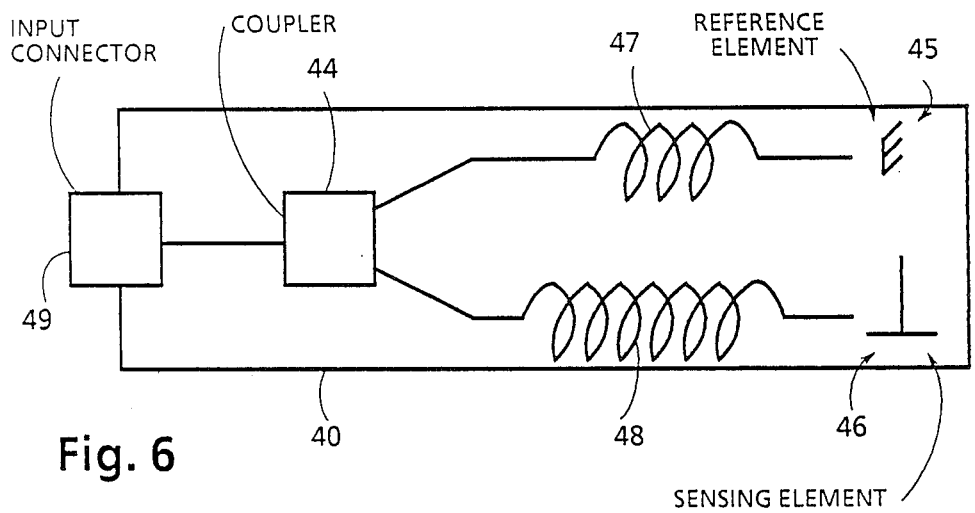
FIG. 6 is a schematic diagram illustrating the arrangement of a unitary sensor in accordance with the invention and in another embodiment which is also suited for use in a multi-sensor device as shown in FIG. 1.

FIG. 6 illustrates another embodiment of a sensor in accordance with the invention. This sensor 40 can advantageously be employed either as a unitary sensor or for the purpose of constituting different sensors of the device of FIG. 1.

In addition to the sensing element 46 which produces the measurement pulse by reflection as in the previous instances, the sensor 40 includes a reference element 45 which is of similar design, with a reflecting device (mirror or retroreflector) at the end of an optical fiber, except for the fact that said reference element is insensitive to the quantity to be measured. This reference element therefore produces by reflection a reference pulse with which the measurement pulse can be compared on condition that these two pulses are distinguished in time in the cumulated signals which are returned to the electronic processing unit.

To this end, the sensor 40 is provided downstream of an input connector 49 with a coupler 44 for distributing the light flux within two arms which are connected respectively to the reference element 45 and to the measurement element 46 by means of two different fiber segments 47 and 48.

The two fiber segments 47 and 48 have predetermined lengths, one of which is twice the length of the other. Thus, in the pulses produced by reflection, the reference pulse is delayed by an elementary time interval with respect to the pulse of the input connector 49 whereas the measurement pulse is delayed by two elementary time intervals with respect to the same pulse of the input connector.

The signals which return to the electronic processing unit accordingly contain, as shown in FIG. 5, an input connector pulse which is distinguished from the reference pulse, the presence or absence of which indicates whether the sensor is connected or not connected and in an operative state. It will be understood that the measurement information obtained may result either from the presence or absence of the pulse, or from an intensity ratio between the measurement pulse and the reference pulse.

When this sensor is employed in the device of FIG. 1, the input connector pulse constitutes the state pulse. Thus, when said pulse is present after the pulse of connector 10 of coupler 12 at the normal instant corresponding to the time-delay introduced by the corresponding fiber segment 15, this indicates that the sensor is connected to the coupler.

It is readily apparent that the invention is not limited in any sense by the particular features specified in the foregoing or by the details of the particular embodiment chosen for the purpose of illustrating the invention. Any alternative arrangements and modifications may be made in the particular embodiment which has been described by way of example and in its constituent elements without thereby departing either from the scope or the spirit of the invention. The invention accordingly includes all means which constitute technical equivalents to the means thus described as well as combinations of such means.

What is claimed is:

1. A sensor for an optical fiber detection device which sensor is adapted for connection with a distal end of an optical fiber transmission line provided at its proximal end with both an emitter emitting periodic pulses of incoherent light into the proximal end of the optical fiber transmission line and a detector detecting light reflected back down the optical fiber transmission line to the proximal end thereof, the sensor comprising:

an input connector means for connecting an input of the sensor with a distal end of an optical fiber transmission line, said input connector means being operable when connected with the optical fiber transmission line to reflect any incoherent light pulses input thereto from the optical fiber transmission line for providing a state signal indicating the state of connection of the sensor with the optical fiber transmission line;

a first optical fiber segment means of a length predetermined for producing an elementary transmission time interval for light therethrough and having one end connected with an output of the input connector means;

an intermediate connector means connected with the other end the first optical fiber segment, said intermediate connector means being operable to reflect any incoherent light pulses input thereto from the first optical fiber segment, for providing a reference signal indicating the intensity of said input light pulses and indicating the state of the connection of the intermediate connector means with the first optical fiber segment means;

a second optical fiber segment means of a length predetermined for producing an elementary transmission time interval for light therethrough equal to that of the first optical fiber segment means and having one end connected with an output of the intermediate connector means; and a sensing element means connected with the other end of the second optical fiber segment means for emitting incoherent light pulses input thereto from the second optical fiber segment means, and for receiving measurement light pulse signals incident thereon and transmitting the received incident measurement light pulse signals back through the second optical fiber segment means, intermediate connector means, first optical fiber segment means and input connector means for transmission back down an optical fiber transmission line connected at the input connector means for indicating a measurement state and for indicating the state of the connection of the sensing element means with the second optical fiber segment means.

2. An optical fiber detection device comprising:

light source means for emitting periodic pulses of incoherent light;

light reception means for detecting pulses of incoherent light received thereby and for outputting an electrical signal in accordance with detection of said received light pulses;

bi-directional coupler means for coupling the light source means and the light reception means with a common light transmission path;

an optical fiber transmission line consisting of a single optical fiber;

first connector means provided at a proximal end of the optical fiber transmission line for connecting the optical fiber transmission line with the bidirectional coupler means, and said first connector means being operable to reflect any pulses of incoherent light input thereto from the bidirectional coupler for providing a state signal indicating the state of the connection of the optical fiber transmission line with the bi-directional coupler means;

star-coupler means having a single light signal input and a plurality of light signal outputs, for directing incident light pulses input at said single input thereof to each of said plural outputs, and for directing incident light pulses input at any of said plural outputs thereof to said single input thereof;

second connector means provided at a distal end of the optical fiber transmission line for connecting the optical fiber transmission line with the single input of the star-coupler, said second connector means being operable to reflect any pulses of incoherent light input thereto from the optical fiber transmission line for providing a state signal indicating the state of the connection of the optical fiber transmission line with the star-coupler means;

a plurality of branch optical fibers each respectively connected at a proximal end thereof with a respective light signal output of the star-coupler means, each of said branch optical fibers having a different length from the others whereby each said branch optical fiber imposes a specific different transmission delay to incoherent light transmitted therethrough; and a plurality of optical sensors each associated with a respective one said branch optical fibers, each said optical sensor including:

an input connector means for connecting an input of the sensor with a distal end of a respective branch optical fiber, said input connector means being operable when connected with the branch optical fiber to reflect any incoherent light pulses input thereto from the branch optical fiber, for providing a state signal indicating the state of connection of the sensor with the branch optical fiber;

an optical fiber segment connected at one end thereof to the input connector means; and a sensing element means connected with the other end of the optical fiber segment for emitting incoherent light pulses input thereto from the optical fiber segment, and for receiving measurement light pulse signals incident thereon and transmitting said measurement light pulse signals back into the optical fiber segment for transmission back down the optical fiber transmission line for indicating a measurement state and for indicating the state of the connection of the sensing element means with the optical fiber segment means.

3. An optical fiber detection device comprising:

light source means for emitting periodic pulses of incoherent light;

light reception means for detecting pulses of incoherent light received thereby and for outputting an electrical signal in accordance with detection of said received light pulses;

bi-directional coupler means for coupling the light source means and the light reception means with a common light transmission path;

an optical fiber transmission line consisting of a single optical fiber;

first connector means provided at a proximal end of the optical fiber transmission line for connecting the optical fiber transmission line with the bidirectional coupler means, and first connector means being operable to reflect any pulses of incoherent light input thereto from the bidirectional coupler for providing a state signal indicating the state of the connection of the optical fiber transmission line with the bi-directional coupler means;

star-coupler means having a single light signal input and a plurality of light signal outputs, for directing incident light pulses input at said single input thereof to each of said plural outputs, and for directing incident light pulses input at any of said plural outputs thereof to said single input thereof;

second connector means provided at a distal end of the optical fiber transmission line for connecting the optical fiber transmission line with the single input of the star-coupler, said second connector means being operable to reflect any pulses of incoherent light input thereto from the optical fiber transmission line for providing a state signal indicating the state of the connection of the optical fiber transmission line with the star-coupler means;

a plurality of branch optical fibers each respectively connected at a proximal end thereof with a respective light signal output of the star-coupler means, each of said branch optical fibers having a different length from the others whereby each said branch optical fiber imposes a specific different transmission delay to incoherent light transmitted therethrough; and a plurality of optical sensors each associated with a respective one said branch optical fibers, each said optical sensor including:

an input connector means for connecting an input of the sensor with a distal end of a respective branch optical fiber, said input connector means being operable when connected with the branch optical fiber to reflect any incoherent light pulses input thereto from the branch optical fiber, for providing a state signal indicating the state of connection of the sensor with the branch optical fiber;

a first optical fiber segment means of a length predetermined for producing an elementary transmission time interval for light therethrough and having one end connected with the input connector means;

an intermediate connector means connected with the other end the first optical fiber segment, said intermediate connector means being operable to reflect any incoherent light pulses input thereto from the first optical fiber segment, for providing a reference signal indicating the intensity of said input light pulses and for indicating the state of the connection of the intermediate connector means with the first optical fiber segment means;

a second optical fiber segments means of a length predetermined for producing an elementary transmission time interval for light therethrough equal to that of the first optical fiber segment means and having one end connected with an the intermediate connector means; and a sensing element means connected with the other end of the second optical fiber segment for emitting incoherent light pulses input thereto from the second optical fiber segment, and for receiving measurement light pulse signals incident thereon and transmitting said measurement light pulse signals back into the second optical fiber segment for transmission back down the optical fiber transmission line for indicating a measurement state and for indicating the state of the connection of the sensing element means with the optical fiber segment means.

4. An optical fiber detection device according to claim 3, further comprising a control and measurement unit in which are provided said light source means, said light reception means and said bi-directional coupler means, the control and measurement unit further comprising:

means for detecting and indicating a non-fault or fault condition of the light source means according to the presence or absence, respectively, of a state signal from the first connector means;

means for detecting and indicating a non-fault or fault condition of the optical fiber transmission line according to the presence or absence, respectively, of a state signal from the second connector means;

means for detecting and indicating a non-fault or fault condition of the star coupler means according to the presence or absence, respectively, of a state signal from the input connector means of the optical sensor; and means for detecting and indicating a non-fault or fault condition of the optical sensor according to the presence or absence, respectively, of a reference signal from the intermediate connector means.

* * * * *